United States Patent
Mansour

(10) Patent No.: US 8,185,045 B2
(45) Date of Patent: May 22, 2012

(54) USE OF SATELLITES BY TERMINALS WITH SMALL ANTENNAS

(75) Inventor: David Mansour, Haifa (IL)

(73) Assignee: Panasonic Avionics Corporation, Lake Forest, CA (US)

( * ) Notice: Subject to any disclaimer, the term of this patent is extended or adjusted under 35 U.S.C. 154(b) by 953 days.

(21) Appl. No.: 12/222,015

(22) Filed: Jul. 31, 2008

(65) Prior Publication Data

US 2009/0052373 A1    Feb. 26, 2009

Related U.S. Application Data

(60) Provisional application No. 60/935,210, filed on Jul. 31, 2007.

(51) Int. Cl.
*H04Q 7/20* (2006.01)

(52) U.S. Cl. ........... 455/12.1; 455/13.1; 455/11.1; 455/15; 455/428; 455/427; 370/315; 370/316; 370/318; 370/322; 370/323

(58) Field of Classification Search ............ 455/12.1, 455/11.1, 15, 19, 13.1, 24, 431, 427, 428, 455/429, 430, 550.1, 422.1, 403, 445, 575.1, 455/575.7; 370/310, 315, 316, 318, 322, 370/323, 325

See application file for complete search history.

(56) References Cited

U.S. PATENT DOCUMENTS

| | | | |
|---|---|---|---|
| 7,155,238 B2 * | 12/2006 | Katz | 455/456.1 |
| 7,634,268 B2 * | 12/2009 | Trachtman et al. | 455/431 |
| 2005/0063456 A1 * | 3/2005 | McIntire et al. | 375/212 |
| 2008/0018545 A1 * | 1/2008 | Kaplan et al. | 343/713 |
| 2009/0022088 A1 * | 1/2009 | Wahlberg et al. | 370/321 |

OTHER PUBLICATIONS

Communication Pursuant to Article 94(3) EPC Dated May 20, 2010 From the European Patent Office Re. Application No. 08789730.2.

* cited by examiner

*Primary Examiner* — Keith Ferguson
(74) *Attorney, Agent, or Firm* — Orrick, Herrington & Sutcliffe LLP

(57) ABSTRACT

Methods to improve the efficiency of satellite transmission by coordinating the use of corresponding channels on adjacent satellites. Improvements over the current state of the art range from 130% to 1000%, yielding in the best case full utilization of potential bandwidth.

22 Claims, 3 Drawing Sheets

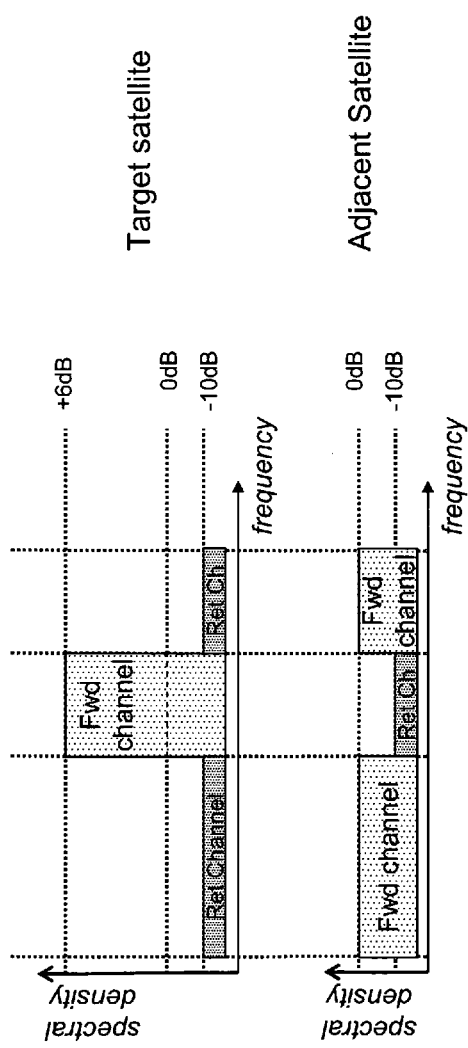
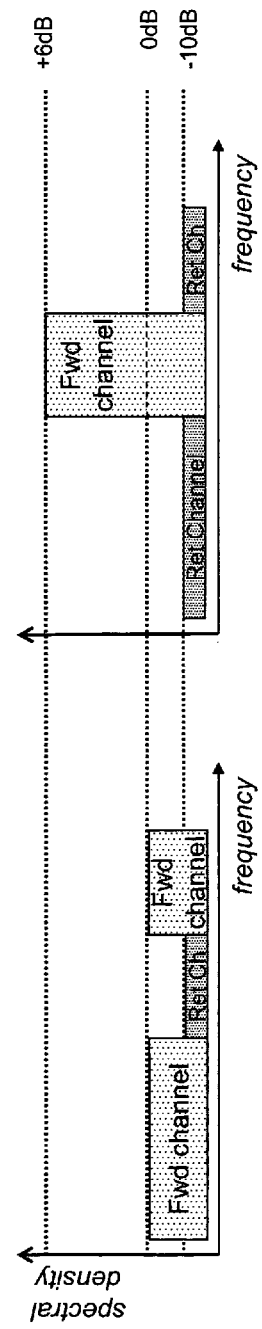
FIG. 2A
FIG. 2B

USE OF SATELLITES BY TERMINALS WITH SMALL ANTENNAS

RELATED APPLICATION/S

The present application claims the benefit under 119(e) of U.S. Provisional Patent Application No. 60/935,210, filed on Jul. 31, 2007, the contents of which are hereby incorporated by reference.

FIELD AND BACKGROUND OF THE INVENTION

The present invention, in some embodiments thereof, relates to satellite communication and, more particularly, but not exclusively to the use of small aperture terminals (e.g., terminals with very small or ultra small dish antennas, i.e., less than 1.2 meters or half meter, respectively), therewith.

Communication satellites typically handle communication traffic from and to hubs (fixed ground stations, also known as earth stations, with relatively large antennas and powerful transmission equipment) as well as from and to terminals (devices, sometimes mobile, with relatively small antennas and less powerful transmission power).

Transmission from the hub to the satellite and from there to the terminals is called "Forward transmission" while transmission from the terminals to the satellite and from there to the hub is called "Return transmission". The channels used for each are called "Forward Channel" and "Return Channel," respectively.

The terms "channel" and "sub-channel" are used in this disclosure to refer to one or more frequencies, for example, a band of frequencies used for transmission and reception. For the purposes of this disclosure "channel" and "sub-channel" are used interchangeably, though sub-channel is generally used in relation to a channel which is a superset of the frequencies of the sub-channel. Also, the verbs "broadcast" and "transmit" are used interchangeably to refer to the emitting of a signal by a hub or terminal and the nouns "broadcast" and "transmission" are used interchangeably to refer to the signal emitted.

The closest spacing between satellites is constrained by technical and regulatory considerations. At the present time, the separation between adjacent spots is 2° or 3° along the geostationary orbit. Multiple satellites may be present in any given spot, but only one satellite in a given spot will operate with a given frequency. As used in this disclosure, Adjacent Satellite refers to a satellite that is located in an adjacent spot along the geostationary orbit next to the Target or given satellite and is operating with the same frequency band as the Target or given satellite.

The size of an antenna, as used in this disclosure, relates specifically to the effective dimension of the part of the antenna substantially aligned with the separation between two satellites and which determines the extent to which a signal emitted from the antenna impinges on an area of space beyond the target satellite, e.g., a satellite in an adjacent spot. An antenna may be substantially circular, in which case the determining size is the diameter, or substantially rectangular or oval or square or any other shape, in which case the size is the relevant dimension.

Small antennas, by their nature, cannot be directed accurately at the desired satellite. As a result, transmissions from a small-aperture terminal in the Return Channel may potentially interfere with transmissions of a neighboring satellite's corresponding channel. To prevent this, it is believed in the art that measures must be taken to ensure that the off-axis EIRP spectral density for co-polarized signals is low enough that interference does not occur or is at acceptable levels.

In particular, in the USA, current regulatory requirements (as of drafting) require non-interference to a theoretical limit of 2° satellite separation as specified in Code of Federal Regulations, Title 47, Part 25, regulations 132 & 209 (in short: 47 CFR part 25). Other examples of regulatory requirements are the EU regulations by ETSI: Standard EN 302 186, and the international regulations by ITU-R (a UN organization): Recommendation document M. 1643 (in short: Recommendation M.1643 of the ITU-R).

Current state of the art teaches the use of spread spectrum techniques to meet the requirement for non-interference with neighboring satellites. Spread spectrum techniques as taught in the current art result in a 75% to 90% loss of bandwidth utilization. Alternative techniques, also with a similar losses are deep coding techniques, requiring, for example, 4 bits of channel to encode 1 bit of data.

When communicating with satellites a satellite modem is used. As used in this disclosure, a "standard modem" refers to a common modem (e.g., one conforming to standards such as, but not limited to, DVB-S (European ETSI standard EN 300 421) or DVB-S2 (European ETSI standard EN 302 307)) without special auxiliary equipment (e.g., for spread spectrum, deep coding, etc.). In accordance with the prior art, a non-standard modem must be used for small antennas, for example a non-standard modem with spread spectrum capability or with deep-coding capability. Small antenna transmission systems and other parts of the communication systems are thus configured to use less than all the available bandwidth for data transmission.

SUMMARY OF THE INVENTION

The present invention, in some embodiments thereof, relates to coordination of channel usage between neighboring satellites, so that small aperture terminals do not cause undue interference.

There is provided in accordance with an exemplary embodiment of the invention, a method for satellite transmission comprising:

a) allocating a channel comprising a set of frequencies with respect to a target satellite;

b) allocating said channel with respect to an adjacent satellite;

c) allocating a sub-channel from the channel for Forward transmissions to the target satellite ("Forward Sub-channel");

d) allocating a different sub-channel from the channel for Return transmissions to the target satellite ("Return Sub-channel"); and e) using the target satellite's Forward Sub-channel in the adjacent satellite for Return transmissions and using the target satellite's Return Sub-channel in the adjacent satellite for Forward transmissions.

Optionally, the method comprises allocating power usage in the target satellite such that the Forward Sub-Channel receives more power than the Return Sub-Channel In an exemplary embodiment of the invention, the method comprises:

obtaining rights to a channel with respect to said target satellite;

identifying a satellite telecommunications provider ("STP") having rights to at least part of said channel with respect to said adjacent satellite; and cooperating with the STP such that the target satellite's Forward Sub-channel is used in the adjacent satellite for Return transmissions and the target satellite's Return Sub-channel is used in the adjacent satellite for Forward transmissions.

In an exemplary embodiment of the invention, the method comprises allocating power usage in the target satellite such that the Forward Sub-Channel receives more power than the Return Sub-Channel In an exemplary embodiment of the invention, said allocations of sub-channels are carried out by programming a satellite control center. Optionally or alternatively, said allocations of sub-channels are carried out by programming a mobile terminal.

In an exemplary embodiment of the invention, said forward sub-channel is a sub-channel from a mobile terminal.

There is provided in accordance with an exemplary embodiment of the invention, a method for satellite transmission comprising:

a) allocating a transmission frequency with respect to a target satellite;
b) allocating the same transmission frequency with respect to an adjacent satellite;
c) transmitting on said transmission frequency to the target satellite; and
d) simultaneously refraining from transmission on said transmission frequency to the adjacent satellite.

In an exemplary embodiment of the invention, the method comprises:

e) configuring the adjacent satellite to allocate power from the transmission frequency to another frequency.

Optionally or alternatively, said allocating comprises programming a control center of said satellite. Optionally or alternatively, said transmitting comprises transmitting using a small antenna.

There is provided in accordance with an exemplary embodiment of the invention, a satellite telecommunications system comprising:

a) a satellite antenna with an effective size less than or equal to 1.2 meters;
b) a standard satellite modem operating over satellite communication channels; and
c) a communications infrastructure configured to provide high-bit-rate telecommunications service in a forward and a return channel and configure to conform to one or more of the following standards: 7 CFR part 25, Standard EN 302 186, Recommendation M.1643 of the ITU-R.

In an exemplary embodiment of the invention, the system is configured to conform to 7 CFR part 25. Optionally or alternatively, the system is configured to conform to Standard EN 302 186. Optionally or alternatively, the system is configured to conform to Recommendation M.1643 of the ITU-R.

In an exemplary embodiment of the invention, the system is mounted on a vehicle. Optionally, the vehicle is an airborne vehicle. Alternatively, the vehicle is a waterborne vehicle.

There is provided in accordance with an exemplary embodiment of the invention, a satellite telecommunications system comprising:

a) a satellite antenna with a first satellite separation ability;
b) a standard satellite modem operating over satellite communication channels; and
c) a communications infrastructure configured to utilize said antenna for communicating with satellites having a separation finer than said ability.

Optionally, said configuration comprises utilizing a higher bandwidth. Optionally or alternatively, said system includes an aircraft on which it is mounted.

There is provided in accordance with an exemplary embodiment of the invention, a method of communicating with a satellite without interfering with neighboring satellites, comprising:

(a) aiming a satellite communication system with a small antenna at a satellite, such that a beam of the antenna covers at least two satellites; and
(b) transmit data to said satellite using said antenna using a standard modem without spread spectrum or deep coding.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard, mouse or touch-screen are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how some embodiments of the invention may be practiced.

In the drawings:

FIG. 2A and FIG. 2B are charts showing an example of signal coordination according to an exemplary embodiment of the invention.

DESCRIPTION OF SPECIFIC EMBODIMENTS OF THE INVENTION

Figure 1:
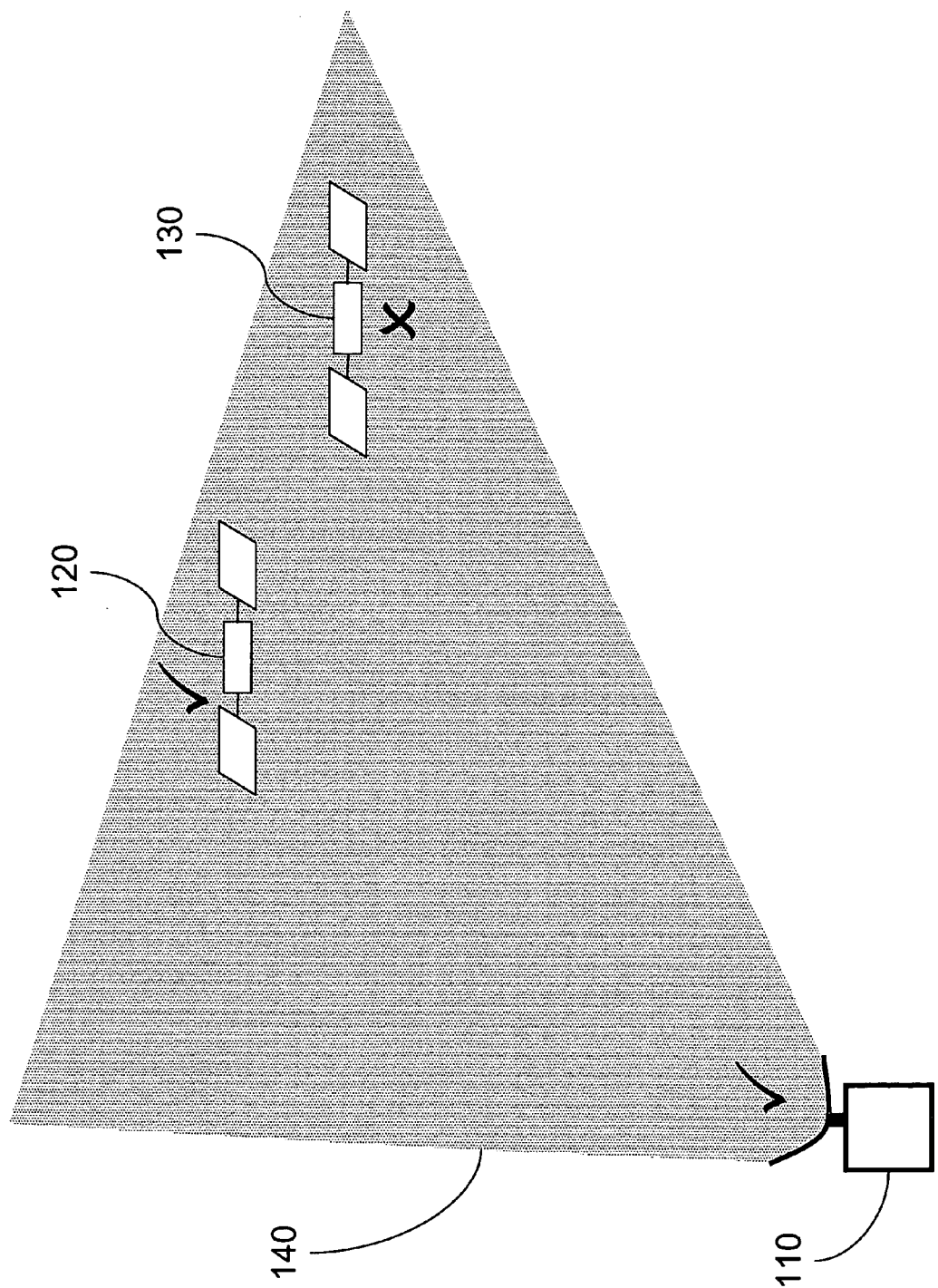
FIG. 1 is a simplified illustration of a terminal and two satellites according to an exemplary embodiment of the invention.

The present invention, in some embodiments thereof, relates to satellite communication and, more particularly, but not exclusively to the use of small aperture terminals (e.g., terminals with small, very small or ultra small antennas, for example, with a effective size of less than 3 meters, 2.5 meters, 2 meters, 1.5 meters, 1.2 meters, 1 meter or half meter), therewith. In an exemplary embodiment of the invention, intermediate advantages are achieved with intermediate sized antennas.

Among the benefits that may be realized when implementing some embodiments of the invention, is increased efficiency including bandwidth and other resource utilization. For example, methods taught in embodiments of the present invention can result in improved efficiency as compared to spread spectrum. Whereas spread spectrum necessarily reduces the effective bandwidth by 75 to 90%, some embodiments of the present invention reduce throughput by amounts less than 75%. For example, in some embodiments, throughput is not reduced at all, while in other embodiments throughput is reduced by amounts ranging up to 66.6%, for example, 30%, 50%, 60%. Optionally, the reduction in throughput is measured over a relatively long time period, such as several hours or days. An additional potential advantage is that use of some of these methods eliminates the requirement for special equipment (e.g., to handle spread spectrum) at one or both of the hub and the terminal.

When using small antennas (for example, USATs—ultra-small-aperture terminals—e.g., with a dish size up to 50 cm), there are two potential areas for interference. In the Forward Channel, an Adjacent Satellite's signal can interfere with the USAT's detection of the desired signal. In the Return Channel, the small antenna cannot deliver a highly directed signal towards a specific satellite. As a result, the small antenna transmission can interfere with signals intended for an Adjacent Satellite, as described above. In particular, in the USA, current regulatory requirements (as of drafting) require non-interference to a theoretical limit of 2° satellite separation.

In a first method of satellite communication, a satellite telecommunications provider ("STP" or "provider") operating at given frequencies in a given satellite (the "Target Satellite") may obtain rights to the same frequencies in the two Adjacent Satellites (i.e., one on either side of the given satellite that are working with the same frequencies). The STP does not use (i.e., refrains from using) the frequencies with respect to the Adjacent Satellites. Since the frequencies are not simultaneously in use in the Adjacent Satellites, a USAT directed towards the given satellite is guaranteed not to interfere with the Adjacent Satellites and can operate at up to full spectral density without using spread spectrum. An embodiment employing the first method can result in one or more of the following advantages:

- Since ⅓ of bandwidth capacity is being used, the loss in efficiency is only 66.6% rather than 75-90% as per the current art.
- If the use and refraining from use of frequencies were repeated for consecutive satellites, a theoretical overall loss of bandwidth of only 50% would be approached.
- This method can be implemented using existing infrastructure and/or devices without the need for special equipment (such as used for spread spectrum or deep coding such as using of metadata for error correction). Optionally, this is used if the satellite separation needs change to become more stringent than the equipment is designed for.

Overall transmission power is one of the limited resources in a satellite. The Adjacent Satellite, whereat the STP is refraining from using a given frequency, can be programmed to allocate the unused power to other channels.

In a second method of satellite communication, optionally combined with the first method (e.g., for one neighboring satellite) the use of channels in neighboring satellites is coordinated to interleave Forward and Return Channels. For example, the sub-channel used for Forward transmission in the Target Satellite is used in the Adjacent Satellites for Return transmission and vice versa.

By interleaving transmission channels, a given satellite at a given frequency is configured for only one of Forward or Return transmissions and eliminating the possibility of interference.

In addition, the Forward Channel may optionally be used to transmit with a stronger signal than is currently used in the art. The details of interleaving channels on adjacent satellites are described in greater detail below.

An embodiment employing the second method can result in one or more of the following advantages:

- There is no loss of bandwidth resources. All potential bandwidth may be utilized in all channels on the Target Satellite and Adjacent Satellites while employing the second method. Some loss may exist due to lack of need for channels to interleave or due to lack of coordination between data sources, for example, 10%, 20%, 30%, 40% or intermediates amounts of loss.
- This method can be implemented using existing infrastructure without the need for special equipment (such as used for spread spectrum).

An embodiment employing a method in accordance with some embodiments of the invention, with a small antenna on a terminal may be programmed or otherwise configured such that the components (terminal, hub and/or control center) behave for transmission and/or reception, as though a large or larger antenna is in use at the terminal. For example, a higher bit-rate may be employed than possible with a small antenna and/or assumptions regarding limited accuracy of the antenna may be eliminated. Optionally, a user can select the terminal or hub or control center to operate as if a large antenna is used or there may be a special setting for a small antenna with high throughput.

In an exemplary embodiment of the invention, a hub or control center which divides up channels takes the increased bandwidth into account. In another example, an existing aircraft communication system is reprogrammed to expect a higher bandwidth without changing the antenna.

In an exemplary embodiment of the invention, a control center or hub is provided which schedules usage of channels, for example, on an hourly basis and/or based on other time slots. Optionally, such an allocation matches up users in need and existing time slots. In an exemplary embodiment of the invention, such a center or hub uses a device (e.g., a computer) which takes the desired interleaving and/or allocation of channels as described above, into account when allocating the channels between users. In an exemplary embodiment of the invention, such a control center and/or hub notifies terminals and/or ground stations regarding new allocation, for example, required to conform with interference regulations. For example, an uplink channel of an airline may be reduced in size if there is a need for a greater number of such channel and/or due to a new use of a same or overlapping channel on a neighboring satellite.

The principles and operation of an apparatus and method according to the present invention may be better understood with reference to the drawings and accompanying description.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates schematically the relationship between a VSAT or USAT and two satellites where an embodiment of the first aforementioned method (i.e., refraining from use of the given frequency on satellites adjacent to the Target Satellite) is employed. The drawing is conceptual and the dimensions and angles should not be taken literally. The terminal 110 is broadcasting in the direction of Target Satellite 120. Because the terminal uses a small-aperture antenna, the transmission cannot be accurate and the Adjacent Satellite 130 is within the transmission area 140 of the terminal 110. According to an embodiment of the first method, the terminal 110 uses a given channel for the transmission, as indicated by the check mark (✓) in the figure next to the terminal 110. The Target Satellite 120 also uses the given channel (i.e., receives the transmissions from the terminal 110), as indicated by the check mark (✓) in the figure next to the Target Satellite 120. The Adjacent Satellite 130, however, is configured to not use the given channel, as indicated by the X mark (x) in the figure next to the Adjacent Satellite.

As described above, since the channel frequencies are not in use in the Adjacent Satellite 130, the terminal 110 directed towards the Target Satellite 120 is guaranteed not to interfere with the Adjacent Satellite 130 and can operate at full spectral density and/or power without using spread spectrum. This method effectively doubles the spacing between satellites actually using the given channel, e.g., from 2° or 3° to 4° or 6°, respectively.

On the Adjacent Satellite 130, since the channel frequencies are not in use, power that would ordinarily have been allocated to the channel frequencies may instead be allocated to other channels. The other channels could then benefit from improved signal-to-noise ratio and/or improved bit-rate.

FIG. 2A and FIG. 2B are charts showing an example of an embodiment of signal coordination according to the second method. Each of the charts in FIG. 2A and FIG. 2B represent the relationship between power and frequency with axes indicating spectral density and frequency, as indicated, for each of a Target Satellite and a satellite adjacent to the Target Satellite. FIG. 2A shows the charts aligned vertically (to better show the frequency relationships between the two satellites) and FIG. 2B shows the same charts aligned horizontally (to better show the power relationship between the two satellites). The sub-channels shown represent a small portion of the total reception band of a satellite for illustration purposes only.

The indicated relative sizes of the sub-channels and the power levels are intended only to illustrate one example of an embodiment and are not intended to be necessarily limiting.

It is to be noted that the acronym EIRP means the "Equivalent Isotropic Radiated Power" and is a standard industry term used to describe and reference the power a satellite is able to project to a region on the earth's surface.

As used in this disclosure, EIRP is an example of how power is referenced and is not intended to be necessarily limiting.

As shown, the interleaving allows for the full use of spectral resources without causing interference to transmissions through the Adjacent Satellite. Furthermore, the interleaving method may be implemented on existing infrastructure without requiring the use of special equipment, such as that used for spread spectrum encoding and decoding. Optionally, reprogramming is provided. Optionally or alternatively, rescheduling and/or assignment of channels is used to implement the above methods.

In an exemplary embodiment of the invention, when scheduling changes, and, for example, the allocation as described herein cannot be maintained, the terminal changes its mode of operation, for example, between the two methods described and/or to using a fall back method, such as spread spectrum or deep coding.

To elaborate further on the example illustrated in FIG. 2A and FIG. 2B, the power available to the satellite may optionally be allocated such that the spectral density in the Forward Channel is increased by, for example, 6 dB, without affecting an Adjacent Satellite, since the Forward Channel is transmitted by a hub with a large antenna aimed accurately at the Target Satellite. Among the benefits that may be realized from this are improved signal-to-noise ratio and improved bit-rate.

Figure 3:
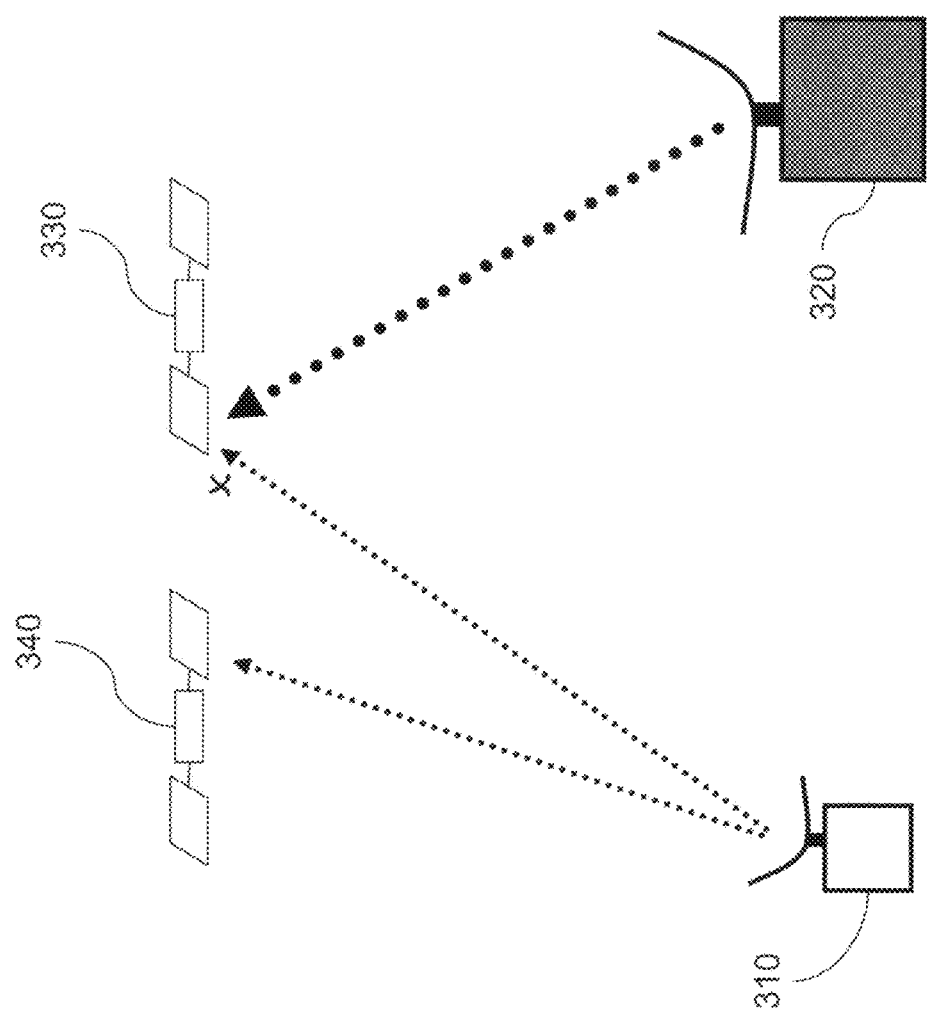
FIG. 3 is a simplified illustration of a terminal, two satellites and a hub using signal coordination according to an exemplary embodiment of the invention.

The presently described method can be further understood with reference to FIG. 3. As shown, a first Satellite 330 is part of a communications network $N_1$ that also includes the earth station, or Hub 320. A second satellite 340 is part of another communications network $N_2$ that includes the terminal 310. Both communication networks are operating on a frequency band, or channel C. C contains sub-channels $c_1$ and $c_2$. On $N_1$, $c_1$ is used as the Forward Channel and $c_2$ is used as the Return Channel, while on $N_2$, it is the opposite, namely $c_2$ is used as the Forward Channel and $c_1$ is used as the Return Channel. In FIG. 3, the dotted lines represent transmissions on $c_1$. As shown, the Terminal 310 is transmitting towards Target Satellite 340, but because it is a small aperture terminal, the transmission may reach the part of space wherein is located Adjacent Satellite 330. However, Adjacent Satellite 330 is configured to use $c_1$ as a Forward Channel (as indicated by the transmission emanating from Hub 320.

Transmissions from Hub 320 are significantly stronger than transmissions from Terminal 310. The resulting mixed signal is relayed by Adjacent Satellite 330 to one or more of the Adjacent Satellite's target terminals, which detect the strong signal from Hub 320 and reject the weak signal from Terminal 310 using standard signal detection techniques known in the art. Thus the signal from Terminal 310 does not interfere with the signal from Hub 320 as indicated by the X mark (x) next to the Adjacent Satellite 330.

The principles described above apply with respect to the alternate sub-channels, i.e., when employing interleaving as described above, a Forward Channel frequency of a given network with respect to a given satellite will be used as the Return Channel frequency for a second network with respect to the same satellite, and vice versa.

As an example of an embodiment of the above described methods, an airplane could be equipped with a terminal to provide satellite-based telecommunication services (or internet or other data services) to equipment or devices (such as personal computers or other devices) on board the airplane. The devices could take advantage of the increased bandwidth available in various ways. For example, more devices could be served. Optionally or alternatively, applications requiring more bandwidth, such as video or telephony may be possible using the above methods.

In a particular, non-limiting example, the satellite operates in the KU band (e.g., uplink at 14-14.5 GHz and downlink at 10.7-12.75 GHz). The antenna has a bandwidth of 500 MHz but is used for narrower sub-channels, such as 24, 36 or 72 MHz wide. Optionally, the modem can be programmed to change its central frequency and/or bandwidth used. Optionally, the bit-rate (uncompressed) provided is between 1 and 10 Mb/s, although higher and lower bitrates (e.g., 0.5 Mb/s or 20 or 30 or 100 Mb/s) may be provided as well, for example, based on the actual channel bandwidth used.

While the descriptions above describe methods that can be used continuously, the above methods can also be used according to arbitrary scheduling. Such scheduling may be coordinated with usage patterns or other criteria. For example, an embodiment of a method could be employed in coordination with flight schedules, if used for communications with airplanes. Scheduled usage of a method may be implemented manually or programmatically.

It is expected that during the life of a patent maturing from this application many relevant satellite communication technologies will be developed and the scope of the terms transmission, terminal, hub, and earth station are intended to include all such new technologies a priori. The various national and international standards referenced herein are brought by way of example only and should not be construed as necessarily limiting. Additionally, references to standards are intended to include a priori any new standards relating to the same subject matter. Also, the references to satellite spacing of 2° and 3° are by way of example only and should not be construed as limiting the invention to those spacings. In an exemplary embodiment of the invention, the above methods are applied with respect to effective antenna beam width (e.g., indicating at what angular spread interference is to be expected), rather than linked specifically to antenna size. For example, a "small" antenna may have an effective beam angle of 1°, 2°, 3°, 4°, or intermediate or larger angles.

In some cases, the antenna may be aimed at a satellite in a slightly off-centered manner, so that interference will tend to be greater with a neighboring satellite which is operated in accordance with a method as described herein and there will be less interference with a different neighboring satellite which is optionally not operated in accordance with the methods described herein.

Also it is noted that a method as described above method may be applied to multiple satellites at a same time, for example, if transmission to a satellite could potentially interfere with three satellites, different methods may be used for each interference case. Optionally or alternatively, the methods are applied to cover a string of neighboring satellites (e.g., 2, 3, 4, 5, 6 or more satellites) and/or a series of ground stations (e.g., 2, 3, 4 or more) and/or multiple networks (e.g., 2, 3, 4 or more). Optionally or alternatively, it is noted that in some cases, two neighboring satellites have a predetermined frequency separation and the methods described herein potentially allow some overlap and are optionally used for such. In some cases, the methods described herein are used for non-geosynchronous satellites, although geosynchronous satellites typically suffer from problems due to their long range, while having a typically fixed angular position for permanent ground stations.

The terms "comprises", "comprising", "includes", "including", "having" and their conjugates mean "including, but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for satellite transmission comprising:
   a) allocating a channel comprising a set of frequencies with respect to a target satellite;
   b) allocating said channel with respect to an adjacent satellite;
   c) allocating a sub-channel from the channel for Forward transmissions to the target satellite ("Forward Sub-channel");
   d) allocating a different sub-channel from the channel for Return transmissions to the target satellite ("Return Sub-channel"); and
   e) using the target satellite's Forward Sub-channel in the adjacent satellite for Return transmissions and using the target satellite's Return Sub-channel in the adjacent satellite for Forward transmissions.

2. The method of claim 1 further comprising:
   allocating power usage in the target satellite such that the Forward Sub-Channel receives more power than the Return Sub-Channel.

3. A method according to claim 1, comprising:
   obtaining rights to a channel with respect to said target satellite;
   identifying a satellite telecommunications provider ("STP") having rights to at least part of said channel with respect to said adjacent satellite; and
   cooperating with the STP such that the target satellite's Forward Sub-channel is used in the adjacent satellite for Return transmissions and the target satellite's Return Sub-channel is used in the adjacent satellite for Forward transmissions.

4. The method of claim 1 further comprising
allocating power usage in the target satellite such that the Forward Sub-Channel receives more power than the Return Sub-Channel.

5. The method of claim 1 wherein said allocatings of sub-channels are carried out by programming a satellite control center.

6. The method of claim 1 wherein said allocatings of sub-channels are carried out by programming a mobile terminal.

7. The method of claim 6, further comprising disposing the mobile terminal aboard a vehicle.

8. The method of claim 7, wherein the vehicle is selected from a group consisting of an airborne vehicle and a waterborne vehicle.

9. The method of claim 1 wherein said forward sub-channel is a sub-channel from a mobile terminal.

10. The method of claim 9, further comprising transmitting from the mobile terminal to the target satellite via said forward sub-channel.

11. The method of claim 10, wherein said transmitting from the mobile terminal includes transmitting from the mobile terminal using a small antenna.

12. The method of claim 11, wherein said transmitting from the mobile terminal using the small antenna includes transmitting with a small satellite antenna with an effective size less than or equal to 1.2 meters.

13. The method of claim 12, wherein the small satellite antenna has an effective size of one-half meter.

14. The method of claim 9, further comprising disposing the mobile terminal aboard a vehicle.

15. The method of claim 14, wherein the vehicle is selected from a group consisting of an airborne vehicle and a waterborne vehicle.

16. A method for satellite transmission comprising:
a) allocating a transmission frequency with respect to a target satellite;
b) allocating the same transmission frequency with respect to an adjacent satellite;
c) transmitting on said transmission frequency to the target satellite;
d) simultaneously refraining from transmission on said transmission frequency to the adjacent satellite; and
e) configuring the adjacent satellite to allocate power from the transmission frequency to another frequency.

17. The method of claim 16, wherein said allocating comprises programming a control center of said satellite.

18. The method of claim 16, wherein said transmitting comprises transmitting using a small antenna.

19. The method of claim 18, wherein said transmitting using the small antenna includes transmitting with a small satellite antenna with an effective size less than or equal to 1.2 meters.

20. The method of claim 19, wherein the small satellite antenna has an effective size of one-half meter.

21. The method of claim 18, wherein said transmitting using the small antenna includes transmitting with a small satellite antenna that is disposed on a vehicle.

22. The method of claim 21, wherein the vehicle is selected from a group consisting of an airborne vehicle and a waterborne vehicle.

* * * * *